United States Patent [19]
Sarett et al.

[11] 3,843,671
[45] Oct. 22, 1974

[54] 5-(OXAZOLYL)- AND 5-(THIENYL)-SALICYCLIC ACIDS

[75] Inventors: Lewis H. Sarett, Skillman; William V. Ruyle, Scotch Plains, N.J.

[73] Assignee: Merck & Co., Inc., Rahway, N.J.

[22] Filed: Sept. 7, 1972

[21] Appl. No.: 287,151

Related U.S. Application Data

[60] Division of Ser. No. 44,867, June 9, 1970, Pat. No. 3,717,659, and a continuation-in-part of Ser. No. 673,273, Oct. 6, 1967, Pat. No. 3,558,641.

[52] U.S. Cl....... 260/307 R, 260/332.2 A, 424/272, 424/275

[51] Int. Cl. .................... C07d 63/12, C07d 85/44
[58] Field of Search ................. 260/307 R, 332.2 A

[56] References Cited
FOREIGN PATENTS OR APPLICATIONS
1,938,904    2/1970    Germany Primary Examiner—G. Thomas Todd

[57] ABSTRACT

5-(oxazolyl)- and 5-(thienyl)-salicyclic acids and processes for their preparation are described. They have antiinflammatory, antipyretic and analgesic activity.

2 Claims, No Drawings

5-(OXAZOLYL)- AND 5-(THIENYL)-SALICYCLIC ACIDS

This is a division of application Ser. No. 44,867, filed June 9, 1970 (now U.S. Pat. No. 3,717,659). Ser. No. 44,867 is a continuation-in-part of our case U.S. Pat. Ser. No. 673,273, filed Oct. 6, 1967 (now U.S. Pat. No. 3,558,641).

CROSS REFERENCES TO RELATED APPLICATIONS

Ser. No. 44,867 is a continuation-in-part of our case U.S. Pat. Ser. No. 673,273, filed Oct. 6, 1967.

BACKGROUND OF THE INVENTION

The development of anti-inflammatory compounds in the past two decades has seen the growth of a great many new drugs. Most of these have been steroids of the 11-oxygenated pregnane series. These, while highly effective, have the drawback of causing many side effects. There is a need in the market for equally effective compounds of much simpler structure and having less side effects.

SUMMARY OF THE INVENTION

This invention relates to new salicylic acid compounds and processes for producing the same, particularly the 5-(heterocyclic)-salicylic acid derivatives. These compounds are useful in that they have anti-inflammatory activity and are effective in the prevention and inhibition of edema and granuloma tissue formation. In addition, they have a useful degree of antipyretic, analgesic, diuretic, hypoglycemic and antifibrinolytic activity.

DESCRIPTION AND PREFERRED EMBODIMENTS

This invention relates to new heterocyclic phenyl compounds and to processes for producing the same. More specifically, it relates to 5-(heterocyclic)-salicylic acid compounds (2-hydroxy-5-heterocyclic benzoic acids). Still more specifically, this invention relates to compounds having the following general formula:

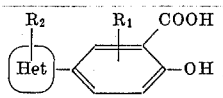

wherein
- (Het) is a 6-membered ring structure containing from 1–3 hetero atoms or a 5-membered ring structure containing from 1–4 hetero atoms. The hetero atoms are either nitrogen, sulphur, or oxygen;
- $R_1$ is hydrogen, lower alkyl, lower alkoxy, halogen, or halo lower alkyl;
- $R_2$ is hydrogen, alkyl (preferably lower alkyl, such as methyl, ethyl, propyl, isopropyl, butyl or pentyl), halo (such as, chlorine, bromine or iodine or fluorine), amino, alkyl amino, (preferably lower alkyl amino, such as methyl amino or isopropyl amino), dialkyl amino, (preferably diloweralkyl amino such as dimethyl amino or diethyl amino), hydroxy or alkoxy (preferably lower alkoxy, such as methoxy or ethoxy).

Preferable examples of the 6-membered ring structure containing from 1–3 hetero atoms are 2,3 or 4- pyridyl, 2 or 3 -pyrazinyl, 2,4 or 5-pryimidyl, 3 or 4-pyridazinyl, s-triazinyl, 3,4 or 6-as-triazinyl (1,2,3-triazinyl; 1,3,5-triazinyl; 1,2,4-triazinyl).

Preferred examples of 5-membered heterocyclic ring structures containing from 1–4 hetero atoms are:
- 2 or 3 furyl,
- 2 or 3 thienyl,
- 3 or 4-(1,2,5-thiadiazolyl),
- 2 or 5-(1,3,4-thiadiazolyl),
- 3 or 5-(1,2,4-thiadiazolyl),
- 1,2 or 4-imidazolyl,
- 2,4 or 5-oxazolyl,
- 3,4 or 5-isooxazolyl,
- 1,2 or 3-pyrrolyl.

The latter three 5-membered heterocyclic ring structures, namely 2,4 or 5-oxazolyl, 3,4 or 5-isoxazolyl, and 1,2 or 3-pyrrolyl are the most preferred 5-membered heterocyclic ring structures with the 1,2 or 3-pyrrolyl group being the specific preferred grouping.

In all the above structures, the $R_2$ substitutent on the heterocyclic nucleus can be in any available position and may be in one or more positions.

Representative compounds of this invention are as follows:
- 5-(2-thienyl)-salicylic acid,
- 5-(1,2 or 3-pyrrolyl)-salicylic acid,
- 5-(2,4 or 5-oxazolyl)-salicylic acid,
- 5-(3,4 or 5-isoxazolyl)-salicylic acid,
- 2-hydroxy-5-(4'-pyrimidyl)-benzoic acid.

We have found that the compounds described above have anti-inflammatory activity and are effective in the prevention and inhibition of edema and granuloma tissue formation. In addition, some of them have a useful degree of anit-pyretic and analgesic activity. For these purposes, they are normally administered orally in tablets or capsules, the optimum dosage depending on the particular compound being used and the type and severity of the condition being treated. Although the optimum quantities to be used will depend on the compound employed and the particular type of disease treated, oral dose levels of preferred compounds in the range of 50 mg. to 10 g. per day are useful in the control of said conditions, depending on the activity of the specific compound and the reaction sensitivity of the patient.

The compounds of the instant invention are generally prepared by a carboxylation reaction wherein the appropriate starting material is reacted with carbon dioxide, preferably in the presence of potassium carbonate. The reaction is usually carried out in a pressurized vessel at a wide range of temperatures especially from about 50° to 200° C., preferably at about 175° C. at 800 p.s.i. initial pressure. The pressure can also vary from atmospheric pressure on up. The reaction is carried out for a sufficient time to consume the stoimetric amount of carbon dioxide. When the reaction is complete, the desired product can be isolated by extraction with water, the water layer then acidified and the precipitated product recrystallized.

Various methods for preparing the end products are shown in the following examples. Also, the following examples should be construed as illustrations of the invention and not limitations thereof.

EXAMPLE 1
PREPARATION OF 5-(2-THIENYL)-SALICYLIC ACID

A mixture of 5 g. of 2-(p-hydroxyphenyl)-thiophene and 12 g. of anhydrous potassium carbonate in glass lined bomb is heated under a carbon dioxide atmosphere (800 p.s.i. initial pressure) at 175° C. for 8 hours. The material from the bomb is partitioned between water and methylene chloride, and the aqueous layer is acidified. The precipitated product is dried and recrystallized from benzene/methanol, using charcoal to remove impurities, to obtain pure 5-(2-thienyl)-salicylic acid.

The preparation of the starting material shown above, namely 2-(p-hydroxyphenyl)-thiophene is shown in J. Gotze (German Patent 1,051,115).

EXAMPLE 2
5-(2-OXAZOLYL)-SALICYLIC ACID

A. p-Nitrobenzalaminoacetaldehyde diethyl acetal 22.7 G. of p-nitrobenzaldehyde and 20.0 g. of aminoacetaldehyde diethyl acetal were heated together in an oil bath at 110°–120° until the liberated water was driven off (ca. 1 hour). The resulting dark red melt was allowed to cool, and then was dissolved in 75 ml. of ether. The solution was driveled over anhydrous magnesium sulfate, filtered by gravity, diluted with about half its volume of ether, and chilled thoroughly in dry-ice. p-Nitrobenzalaminoacetaldehyde diethyl acetal separated as pale yellow crystals which were collected by filtration, washed well with ether and air-dried. The recovery was 31.4 g. (79 percent), m.p. 54°–56°.

B. 2-(p-Nitrophenyl)oxazole 30.6 G. of p-nitrobenzalaminoacetaldehyde diethyl acetal was added slowly in small portions to 150 ml. of concentrated sulfuric acid which was being stirred mechanically and kept at 0°–5° by immersion in an ice bath. The resulting cold, dark orange solution was transferred to a dropping funnel, and added quite rapidly to a vigorously stirred mixture of 60 g. of phosphorus pentoxide and 15 ml. of concentrated sulfuric acid immersed in an oil bath maintained at 175°–180°. The very dark reaction mixture was then stirred at 180° for an additional 20 minutes.

Upon cooling, the reaction mixture was poured onto ice (ca. 1 kg.), and then was neutralized with concentrated ammonia. The resulting dark brown, mud-like precipitate was collected by filtration, sucked as dry as possible, and then taken up in the minimum quantity of boiling ethanol (ca. 450 ml.). The solution was treated with charcoal, filtered by gravity, and cooled thoroughly. A brownish crystalline solid (10.5 g.) was recovered.

Recrystallization of the crude product (10.5 g., 48 percent) from ethanol (charcoal) gave 2-(p-nitrophenyl)oxazole as fine, yellow needles (7.8 g.), m.p. 162°–163° (clear, pale yellow melt).

C. 2-(p-Aminophenyl)oxazole 3.8 G. of 2-(p-nitrophenyl)oxazole was hydrogenated in 50 ml. of ethanol over Raney nickel (1.5 g.).

After filtration of the catalyst, and evaporation of the ethanol in vacuo, the yellow solid residue was taken up in hot benzene (ca. 20 ml.), the solution filtered, and the filtrate treated gradually with ether until crystallization began (~7–8 ml. added). The recovery of 2-(p-aminophenyl)oxazole yellowish crystals, m.p. ca. 105°–120°, was 1.5 g. (47 percent).

D. 2-(p-Hydroxyphenyl)oxazole

To a stirred solution of 480 mg. of 2-(p-aminophenyl)oxazole in 10 ml. of 2N sulfuric acid immersed in an ice bath was added a solution of 230 mg. of sodium nitrite in 5 ml. of cold water, the addition being made dropwise in 5 min. The ice bath was not replenished, and the solution was allowed to warm to room temperature with continued stirring during the next hour.

The solution was then warmed on the steam bath until nitrogen evolution ceased, allowed to cool, and then filtered. The filtrate was treated with 2.5N NaOH to pH 5, affording 2-(p-hydroxyphenyl)oxazole as a brown solid precipitate which was collected by filtration, washed with water and air dried to yield 385 mg. (80 percent), m.p. ca. 155°–170°.

E. 5-(2-Oxazolyl)salicylic acid

403 Mg. of 2-(p-hydroxyphenyl)oxazole and 0.5 g. of potassium carbonate were put into a bomb and the reaction mixture heated under an initial carbon dioxide pressure of 650 p.s.i. at 200° C. for approximately 6 hours or until the uptake of carbon dioxide gas ceases. The reaction mixture was then cooled and the contents of the bomb taken up in 30 ml. of water with warming to effect solution. Following gravity filtration, the solution was made strongly acid with concentrated hydrochloric acid. The grey precipitate which formed was collected by filtration, washed with water, slurried with ethanol and allowed to air dry. 395 Mg. of crude 5-(2-oxazolyl)salicylic acid was recovered.

300 Mg. of the crude 5-(2-oxazolyl)salicylic acid was recrystallized from 15 ml. of ethanol to yield 195 mg. of fine creamy white needles of 5-(2-oxazolyl)salicylic acid, m.p. 253°–256° C.

What is claimed is:
1. 5-(2-Oxazolyl)salicylic acid.
2. 5-(2-Thienyl)salicylic acid.

* * * * *